United States Patent
Doshi et al.

(10) Patent No.: US 9,284,419 B2
(45) Date of Patent: Mar. 15, 2016

(54) METHOD OF PREPARING A NANOPARTICLE DISPERSION OF A MODIFIED METAL OXIDE

(75) Inventors: Dhaval A. Doshi, Lexington, MA (US); Zhifeng Li, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 12/712,501

(22) Filed: Feb. 25, 2010

(65) Prior Publication Data

US 2010/0216911 A1 Aug. 26, 2010

Related U.S. Application Data

(63) Continuation of application No. PCT/US2008/009916, filed on Aug. 20, 2008.

(60) Provisional application No. 60/966,954, filed on Aug. 31, 2007, provisional application No. 61/065,887, filed on Feb. 15, 2008.

(51) Int. Cl.
| | |
|---|---|
| C08K 3/22 | (2006.01) |
| B82Y 30/00 | (2011.01) |
| C08J 3/205 | (2006.01) |
| C08K 9/04 | (2006.01) |
| C08F 2/06 | (2006.01) |
| C08F 2/44 | (2006.01) |
| C08J 3/28 | (2006.01) |
| C08J 5/00 | (2006.01) |

(52) U.S. Cl.
CPC .............. *C08J 3/2053* (2013.01); *B82Y 30/00* (2013.01); *C08F 2/06* (2013.01); *C08F 2/44* (2013.01); *C08J 3/28* (2013.01); *C08J 5/005* (2013.01); *C08K 3/22* (2013.01); *C08K 9/04* (2013.01)

(58) Field of Classification Search
CPC ............ C08K 3/22; C08K 9/04; B82Y 30/00; C08J 3/2053
USPC .................................. 523/200, 333
See application file for complete search history.

(56) References Cited

U.S. PATENT DOCUMENTS

| | | | |
|---|---|---|---|
| 4,990,653 A | 2/1991 | Hayakawa et al. | |
| 5,618,872 A * | 4/1997 | Pohl et al. | 524/430 |
| 5,683,628 A | 11/1997 | Mizuno et al. | |
| 6,160,151 A | 12/2000 | Compton et al. | |
| 6,328,947 B1 * | 12/2001 | Monden et al. | 423/611 |
| 7,160,972 B2 | 1/2007 | Young et al. | |
| 7,662,879 B2 * | 2/2010 | Bhandarkar et al. | 524/430 |
| 7,985,476 B2 | 7/2011 | Kurino et al. | |
| 2006/0052486 A1 * | 3/2006 | Fujita | 523/212 |
| 2006/0084727 A1 * | 4/2006 | Yan et al. | 523/444 |
| 2007/0036962 A1 | 2/2007 | Sasaki et al. | |
| 2007/0208122 A1 * | 9/2007 | Bhandarkar et al. | 524/430 |

FOREIGN PATENT DOCUMENTS

| | | |
|---|---|---|
| EP | 1510557 | 7/2008 |
| JP | 2006273709 | 10/2006 |
| JP | 2007-016189 | 1/2007 |
| WO | 2007070647 A1 | 6/2007 |
| WO | 2009032072 A2 | 3/2009 |

OTHER PUBLICATIONS

Guerrero, P. H., et al., "Anchoring of Phosphonate and Phosphinate Coupling Molecules on Titania Particles," Chem. Mater. 2001, 13, 4367-4373.*
Machine translation of JP 2006-273709, Oct. 12, 2006.*
Yogo, et al. Journal of Nanoparticle Research (2005) 7: 633-640.*
Human translation of JP 2006-273709 A, Oct. 12, 2006.*
International Preliminary Report on Patentability with Written Opinion dated Mar. 2, 2010 received in PCT Application No. PCT/US2008/009916.

* cited by examiner

*Primary Examiner* — Vickey Nerangis

(57) ABSTRACT

The present invention relates to a method of preparing polymer compositions comprising modified metal oxides in a polymer wherein a nanoparticle dispersion of a metal oxide in a non-aqueous solvent is combined with at least one coupling agent to form a nanoparticle dispersion of a modified metal oxide in the non-aqueous solvent. The nanoparticle dispersion is then combined with a polymer followed by the removal of the non-aqueous solvent or, alternatively, combined with a monomer, which is polymerized to form the polymer and removal of the solvent, in any order. Also disclosed are polymer compositions prepared by this method.

19 Claims, 6 Drawing Sheets

III

METHOD OF PREPARING A NANOPARTICLE DISPERSION OF A MODIFIED METAL OXIDE

RELATED APPLICATIONS

This application is a continuation of PCT Patent Application No. PCT/US2008/009916, filed Aug. 20, 2008, published as WO2009/032072, and titled METHOD OF PREPARING A NANOPARTICLE DISPERSION OF A MODIFIED METAL OXIDE. This application also claims the benefit of U.S. Provisional Application Ser. No. 60/966,954, filed Aug. 31, 2007, and U.S. Provisional Application Ser. No. 61/065,887, filed Feb. 15, 2008. Each of these patent applications is hereby incorporated by reference herein.

BACKGROUND OF THE INVENTION

1. Field of the Invention

The present invention relates to polymer compositions comprising a modified nanoparticle dispersed in a polymer and methods of preparing the same.

2. Description of the Related Art

Polymer compositions have been used to replace glass compositions in a variety of different applications, including optical devices such as lenses. The specific requirements of the application determine the type of polymer chosen. For example, in some applications, it may be desirable to provide a polymer composition having improved physical properties, such as mechanical strength, heat resistance, or toughness. In addition, processiblity, moldability, and cost may also need to be considered.

For optical devices, improved optical properties such as refractive index, transparency or clarity, and optical uniformity may also be important, and polymer compositions have these improved properties have been prepared. For example, U.S. Pat. No. 4,990,653 describes the preparation of a sulfur-containing oligomer composition which can be polymerized to form a cured product having a refractive index of 1.60 or higher along with excellent transparency and optical uniformity. In addition, U.S. Pat. No. 5,683,628 describes a photochromic resin composition comprising a specific class of di(meth)acrylate compounds which are described as having excellent heat resistance, mechanical strength, adhesion properties, moldability, and light resistance. These can be used, for example, as an antireflection film on a lens. The refractive index of the composition can be controlled by varying the amount of specific di(meth)acrylate compound and can be 1.54 or higher. However, with the ever-increasing demands for improved optical performance, along with the need for improved physical properties, processability and reduced cost, the use of these types of tailored polymers is limited.

Several types of metal oxides are known to have high refractive indexes. For example, in general, titanium dioxide (titania), zirconium oxide (zirconia), cerium oxide (ceria), tantalum oxide, niobium oxide, zinc oxide, barium titanate, and strontium titanate, have a refractive index that is greater than or equal to about 1.7. However, metal oxides may be difficult to disperse well in a polymeric system, and poor dispersions typically have poor optical properties. In order to provide improved dispersibility in various matrices, including solvents and polymer systems, modified metal oxides have been prepared, and the type of modification used depends on the specific system. For example, silane coupling agents having functionality capable of reacting with silica and with a rubber matrix have been used to prepare modified silica particles for use in tire applications. Modifications to other metal oxides, including those with high refractive indexes, are also known. However, the modification made to the metal oxide would be expected to greatly decrease the material's refractive index, thereby reducing the effectiveness of the modified metal oxide for an optical application. Furthermore, modification of nanoparticle dispersions of metal oxides (those having a particle size of less than 50 nm) often results in an undesirable increase in particle size, with subsequent loss in optical clarity. Maintaining particle size typically requires either the use of stabilizing agents, such as dispersants, which often have a negative effect on physical and optical properties, or mechanical methods of particle size reduction. For example, U.S. Patent Publication No. 2007/0036962 describes a method of preparing a nanoparticle-resin composite, which includes a step of modifying a dispersion of a metal oxide with an organic compound. The resulting modified metal oxide is then isolated by precipitation and reaggregation and subsequently dispersed in the polymer using mechanical dispersion techniques. Such multiple step methods are often cumbersome and inefficient, as well as costly and labor intensive. The resulting composite would also be expected to have undesirable optical properties, including haze and high scattering.

Thus, there is a need in the industry to provide polymer compositions for optical devices which have good overall performance, including mechanical properties and process ability, along with improved optical properties, especially high refractive index and transparency. Furthermore, there is a need for a method for preparing polymer compositions comprising a nanoparticle dispersion of a metal oxide without loss of the nanoparticle size of the metal oxide.

SUMMARY OF THE INVENTION

The present invention relates to a method of preparing a polymer composition comprising a modified nanoparticle dispersed in a polymer. In one embodiment, the method comprises the steps of: i) combining a nanoparticle dispersion of a metal oxide in a non-aqueous solvent and at least one coupling agent to form a nanoparticle dispersion of a modified metal oxide in the non-aqueous solvent; ii) combining the nanoparticle dispersion of the modified metal oxide in the non-aqueous solvent and at least one polymer; and iii) removing the non-aqueous solvent to form the polymer composition. In a second embodiment, the method comprises the steps of: i) combining a nanoparticle dispersion of a metal oxide in a non-aqueous solvent and at least one coupling agent to form a nanoparticle dispersion of a modified metal oxide in the non-aqueous solvent; ii) combining the nanoparticle dispersion of the modified metal oxide in the non-aqueous solvent and at least one monomer to form a polymerizable composition; iii) removing the non-aqueous solvent; and iv) polymerizing the polymerizable composition to form the polymer composition. For both embodiments, the coupling agent has a refractive index of greater than or equal to 1.48. Alternatively, or in addition, the polymer composition has a refractive index of greater than or equal to 1.5. Preferably the polymer composition is transparent. The present invention further relates to a polymer composition comprising a modified nanoparticle dispersed in a polymer prepared by the methods described herein.

It is to be understood that both the foregoing general description and the following detailed description are exemplary and explanatory only and are intended to provide further explanation of the present invention, as claimed.

DETAILED DESCRIPTION OF THE INVENTION

The present invention relates to methods of preparing polymer compositions comprising modified nanoparticulate metal oxides in a polymer, as well as to the polymer compositions prepared therefrom.

The method of the present invention comprises the step of combining a nanoparticle dispersion of a metal oxide in a non-aqueous solvent and at least one coupling agent to form a nanoparticle dispersion of a modified metal oxide in the non-aqueous solvent.

The metal oxide may be any inorganic oxide known in the art. For example, the metal oxide may be titanium dioxide (titania), zirconium oxide (zirconia), cerium oxide (ceria), zinc oxide, barium titanate, or strontium titanate. Preferably the metal oxide is barium titanate. The metal oxide is one having a very small average particle size when dispersed in the non-aqueous solvent, described in more detail below, and therefore forms a nanoparticle dispersion in the non-aqueous solvent. By "nanoparticle dispersion" is meant that the average particle size of the dispersed particle (in this case, the metal oxide) is less than 50 nm. For example, the metal oxide in the non-aqueous dispersion preferably has a particle size of less than 50 nm, more preferably less than 20 nm, including between about 2 and about 15 nm or, more preferably, between about 5 and 10 nm. Also, the metal oxide in the dispersion preferably also has a particle size of greater than or equal to 0.5 nm and more preferably greater than or equal to 1 nm. The particle size may be determined using any technique known in the art including, for example, dynamic light scattering or small angle x-ray scattering (SAXS). Furthermore, preferably the metal oxide has a refractive index that is greater than or equal to about 1.8, such as between about 1.9 and 2.9. Refractive index values, as used herein, are at room temperature and at sodium D-line (589 nm), unless otherwise indicated.

The non-aqueous solvent is a solvent or mixture of solvents that comprises ≤10% by weight water, preferably ≤5% water, including ≤2% or ≤1% by weight water (trace levels). Furthermore, the non-aqueous solvent is one in which the metal oxide forms a stable nanoparticle dispersion (having a particle size of less than 50 nm at concentrations of between about 0.001 vol % to about 10 vol %). The non-aqueous solvent may comprise various water immiscible solvents such as hydrocarbon solvent, ester solvents (including ethyl acetate), and aromatic solvents (including toluene, xylene, benzene and the like). Other water immiscible solvents can also be chosen, depending on the solubility characteristics and reactivity of the coupling agent, polymer, or monomer, described in more detail below. Preferably, the solvent is soluble or miscible with water and therefore may contain trace amounts of water. Examples include water-miscible ethers (such as tetrahydrofuran), ketones (such as methyl ethyl ketone or acetone), glymes (such as diglyme), and glycol ethers (such as ethoxy ethanol or ethoxy propanol). Also, the non-aqueous solvent may be the monomer used to form the polymer composition or may comprise the monomer, described in more detail below.

The nanoparticle dispersion of the metal oxide in the non-aqueous solvent can be prepared using any method known in the art, such as the methods described in G. Hsiue, Li W. Chu, and I. N. Lin, *Colloids and Surfaces* A: Physiochem. Eng. Aspects, 294, (2007), 212-220; U. Paik, V. Hackley, S. Choi, and Y. Jung, *Colloids and Surfaces* A: Physiochem. Eng. Aspects, 135, (1998), 77-88; K. Sumida, K. Hiramatsu, W. Sakamoto, and T. Yogo, *Journal of Nanoparticle Research*, (2007), 9(2), 225-232; and T. Yogo, R. Fukuzawa, W. Sakamoto, and S. Hirano, *Journal of Nanoparticle Research*, (2005), 7, 633-640, each of which is incorporated by reference herein. For example, the metal oxide may be formed in the non-aqueous solvent by hydrolysis of a metal oxide precursor. Alternatively, the metal oxide may be formed and dispersed in the non-aqueous solvent under high shear conditions, to form a nanoparticle dispersion. The metal oxide may also be formed by decomposition of a metal oxide precursor. Preferably, no dispersant is used.

In the method of the present invention, a nanoparticle dispersion of a modified metal oxide is formed by combining the nanoparticle dispersion of the metal oxide and a coupling agent. The coupling agent can be any material that is capable of reacting or interacting with the metal oxide. For example, the coupling agent may comprise at least one group capable of reacting with the metal oxide, such as by forming a covalent or ionic bond with the metal oxide surface. Examples of reactive groups include metal-containing groups, such as Si, Ti, Sn, or Se-containing groups, carboxylic acid groups, such as aryl or alkyl carboxylic acids, sulfinic or sulfonic acid groups, thiols, and phosphorous-containing groups, such as groups having at least one P—O or P=O bond, including a phosphonic acid group, a phosphinic acid group, a phosphinous acid group, a phosphite group, or a phosphate, diphosphate, triphosphate, or pyrophosphate groups, as well as partial esters thereof, or salts thereof. For example, the reactive group may be a phosphonic acid group, partial ester thereof, or salt thereof. By "partial ester thereof" is meant that the phosphonic acid group may be a partial phosphonic acid ester group having the formula —PO$_3$RH, or a salt thereof, wherein R is an aryl, alkaryl, aralkyl, or alkyl group. By "salts thereof" is meant that the phosphonic acid group may be in a partially or fully ionized form having a cationic counterion. Thus, the reactive group may comprise a group having the formula —PO$_3$H$_2$, —PO$_3$H$^-$M$^+$ (monobasic salt), or —PO$_3^{-2}$M$^+_2$ (dibasic salt), wherein M$^+$ is a cation such as Na$^+$, K$^+$, Li$^+$, or NR$_4^+$, wherein R, which can be the same or different, represents hydrogen or an organic group such as a substituted or unsubstituted aryl and/or alkyl group.

The coupling agent is also capable of reacting or interacting with the medium in which it is dispersed. In this way, the coupling agent "couples" the metal oxide and the medium, forming a nanoparticle dispersion of a modified metal oxide. For example, along with a group capable of reacting or interacting with the metal oxide, the coupling agent further comprises at least one group capable of interacting with the non-aqueous solvent. For this example, the coupling agent may comprise at least one polyalkylene oxide group, such as a group having the formula —(O-ALK1)$_x$-(O-ALK2)$_y$-(O-ALK3)$_z$—. ALK1, ALK2, and ALK3 are linear or branched C1-C8 alkylene groups, x is 1 to 10, and y and z are 0 to 10. It has been found that such coupling agents can be used to prepare a nanoparticle dispersion of a modified metal oxide in a non-aqueous solvent, such as an ether solvent, from a nanoparticle dispersion of a metal oxide, such as titania or barium titanate, in the same non-aqueous solvent. As another example, the coupling agent may comprise at least one siloxane group having the formula R$_1$—[SiR$_2$R$_3$—O]$_n$—, wherein R$_1$ is a C1-C8 alkyl group (such as a methyl, ethyl, propyl, or butyl group), R$_2$ and R$_3$ are independently a C1-C6 alkyl group or an aryl group (such as a methyl group or phenyl group), and n is 1-12, including from 1-9. For this example, the siloxane group of the coupling agent may be a group having the formula R$_1$—[SiMe$_2$-O]$_n$—SiMe$_2$-(ALK1-O)$_x$—, wherein ALK1 and x are as shown above. The choice of reactive group and ALK1, ALK2, ALK3, R$_1$, R$_2$, R$_3$, n, x, y, and z will depend on the type of metal oxide and on the type of non-aqueous medium in which the nanoparticle metal oxide is dispersed. For example, for a coupling agent comprising at least one polyalkylene oxide group having the formula shown above, x can be 2-8 and y and z can be 0, which would be a polyalkylene oxide group such as polyethylene oxide, polypropylene oxide or polybutylene oxide. For this example, the coupling agent can comprise a group having the formula (HO)$_2$P(O)—(O-ALK1)$_x$- or (HO)$_2$P(O)-(ALK1-O)$_x$—.

The coupling agent may further be capable of reacting or interacting with the polymerizable monomer, which is described in more detail below, as well as the polymer formed from the polymerizable monomer, or both. For example, if the monomer is a radically-polymerizable monomer, the coupling agent may also comprise at least one radically-polymerizable group, such as an acrylate or methacrylate group. Also, the coupling agent may be capable of reacting or interacting with the polymer of the polymer composition, described in more detail below. For example, if the polymer is an ether polymer, such as a polyalkylene oxide, or a siloxane polymer, such as a silicone oil, the coupling agent may comprise groups enabling the modified metal oxide to form a nanoparticle dispersion in the polymer, such as the polyalkyene oxide coupling agents described above.

The coupling agent may be in the form of a liquid or solid. For example, the coupling agent may be either a dispersion or solution in the non-aqueous solvent. The non-aqueous solvent should be non-reactive with the coupling agent.

Figure 1:
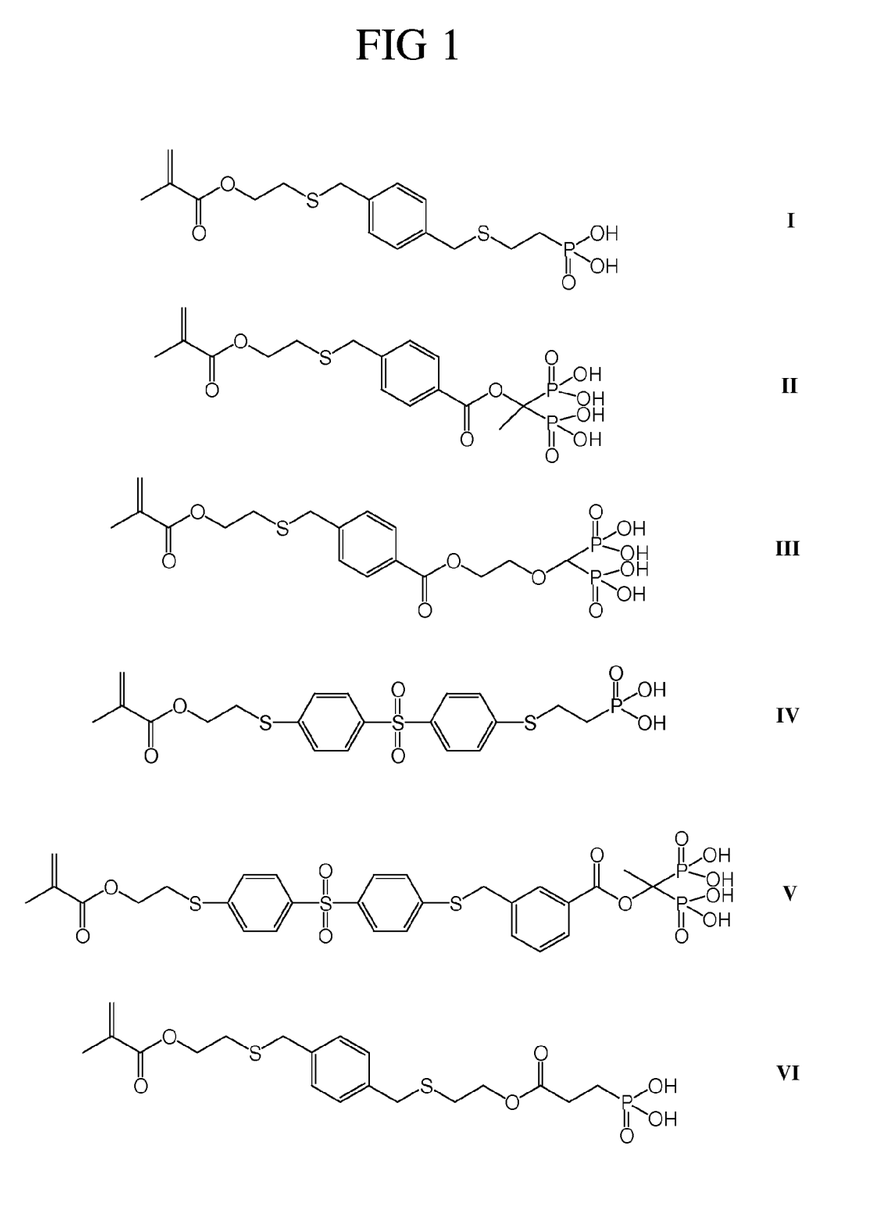
FIG. 1 shows representative coupling agents that can be used in the compositions and methods of the present invention.

Coupling agents having a high refractive index are particularly useful for the polymer compositions formed by the method of the present invention. Preferably, the coupling agent has a refractive index of greater than or equal to 1.48, more preferably greater than or equal to 1.5, even more preferably greater than or equal to 1.55, and most preferably greater than or equal to 1.6, such as greater than or equal to 1.64. Unlike conventional coupling agents, coupling agents having these refractive index values, in combination with a metal oxide, produce a modified metal oxide which has improved overall performance, particularly optical performance, in a polymer composition. Examples of coupling agents having these refractive index values include those that comprise at least one arylene or heteroarylene and either at least one sulfur-containing group, such as a thioether group or a sulfone group, or at least one halogen. Specific examples include compounds shown in FIG. 1. For comparison purposes, conventional coupling agents and their corresponding refractive index values (R.I.) are shown in Table 1 below.

TABLE 1

| Conventional Coupling Agent | R.I. | Temperature (° C.) |
|---|---|---|
| octyltriethoxy silane | 1.416 | 20 |
| octadecyl trimethoxy silane | 1.439 | 20 |
| hexadecyl triethoxy silane | 1.437 | 20 |
| decyl triethoxy silane | 1.422 | 20 |
| stearic Acid | 1.4299 | 80 |
| oleic Acid | 1.4449 | 60 |
| palmitic Acid | 1.4335 | 60 |
| glycolic acid-n-butyl ester | 1.427 | 20 |
| Phenethyltrimethoxysilane | 1.4753 | 20 |
| ethylene glycol | 1.431 | 20 |
| Polyethylene glycol | 1.459 | 20 |
| 3-aminopropyltriethoxysilane | 1.4225 | 20 |
| 3-glycidyl trimethoxy silane | 1.429 | 20 |
| 3-mercpatropropyl trimethoxy silane | 1.4502 | 25 |

In the method of the present invention, the nanoparticle dispersion of metal oxide in the non-aqueous solvent and the coupling agent are combined to form a dispersion of a modified metal oxide, also as a nanoparticle dispersion in the non-aqueous solvent. The modified metal oxide thus comprises the reaction product of the metal oxide and the coupling agent. The amount of the metal oxide and the coupling agent that are combined to form the modified metal oxide can vary depending on a variety of factors, including for example, the type of metal oxide (such as particle size, surface area, density, and the number and type of reactive groups) as well as the desired properties of the modified metal oxide. For example, the metal oxide and the coupling agent may be used in a weight ratio of between about 1:4 and 100:1 metal oxide to coupling agent, including between about 4:1 and about 100:1, between about 25:1 and about 100:1, and between about 50:1 and about 100:1. In general, the higher the density of the metal oxide, the lower the ratio of metal oxide to coupling agent (by weight). The smaller the particle size, the higher the surface area (by weight), which would mean a lower ratio of metal oxide to coupling agent. Also, in order to maximize the refractive index of the final polymer composition, a higher ratio of a high refractive index metal oxide to coupling agent would be desired, depending on the refractive index of the coupling agent (the ratio could be lower for high refractive index coupling agents). For the method of the present invention, the amount of coupling agent used can be controlled so that the potential need for any purification due to excess coupling agent is avoided. This also provides for a higher refractive index polymer composition when the coupling agent has a refractive index lower than the refractive index of the polymer since the composition is not adversely impacted by the presence of significant excess of a low refractive index coupling agent.

Surprisingly, it has been found that the resulting modified metal oxide is also in the form of a nanoparticle dispersion. Thus, it has been found that a modified metal oxide can be prepared from a nanoparticle dispersion of a metal oxide in a non-aqueous solvent without significant loss of its nanoparticulate nature.

In a first embodiment of the method of the present invention, the method further comprises the step of combining the nanoparticle dispersion of the modified metal oxide in the non-aqueous solvent and a polymer. The polymer may be in the form of a liquid or solid, and a variety of different polymers may be used, depending on the desired properties and use of the polymer composition. For example, types of polymers include silicone polymers, such as a polysiloxane homopolymer or copolymer (including, for example, methylphenyl polysiloxanes, methylphenyl hydrogen polysiloxanes, diphenyl polysiloxanes, diphenyl hydrogen polysiloxanes, or mixtures thereof), epoxies, polycarbonates, polyesters, and polyurethanes. Suitable silicone polymers include those described in U.S. Patent Publication No. 2007/0036962 and U.S. Pat. Nos. 7,160,972 and 6,160,151, which are incorporated by reference herein. Preferably, the polymer is one that is soluble in the non-aqueous solvent and is used either as a dispersion or solution in the non-aqueous solvent. Additionally, the polymer may be a dispersion or solution in an organic solvent that is different from the non-aqueous solvent, forming a polymer solution that is soluble in the non-aqueous solvent.

For this embodiment, the method of the present invention further comprises the step of removing the non-aqueous solvent after combining the nanoparticle dispersion of the modified metal oxide and the polymer, thereby forming a dispersion of the modified metal oxide in the polymer. To remove the non-aqueous solvent, a variety of different methods known in the art may be used. For example, the non-aqueous solvent may be removed by evaporation, either at atmospheric or reduced pressures. Preferably, the non-aqueous solvent can be removed under conditions that do not cause signification discoloration or decomposition of the polymer. For this reason, some of the non-aqueous solvent may also be removed prior to combining the nanoparticle dispersion of the modified metal oxide and the polymer, which minimizes the amount of non-aqueous solvent to remove after combining the dispersions and the polymer, and can, for example, thereby reduce the heat history on the polymer. While some of the solvent may be removed, the modified metal oxide should still be in the form of a dispersion (that is, some, but not all of the non-aqueous solvent can be removed). Also, a solvent exchange can also be used in this method, especially to replace the non-aqueous solvent with one that can be more easily or economically removed.

In a second embodiment, the method of the present invention further comprises the step of combining the nanoparticle dispersion of the modified metal oxide in the non-aqueous solvent and a monomer to form a polymerizable composition. The monomer can be an inorganic or an organic compound that is capable of forming a polymer under conditions known in the art. For example, the monomer may be any radically polymerizable monomer, including, for example, an ethylenically unsaturated monomer such as a substituted or unsubstituted alkyl acrylate or methacrylate monomer or a substituted or unsubstituted styrenic monomer. Others will be known to one skilled in the art.

The monomer may be one that is capable of forming a homopolymer or copolymer having a high refraction index, such as 1.5 or more. Examples include mono(meth)acrylate compounds having the formula $CH_2=C(R^1)-COOR^2$ wherein $R^1$ is a hydrogen or a methyl group and $R^2$ is a substituted or unsubstituted phenyl, benzyl or 2-phenoxyethyl group. Specific examples of mono(meth)acrylate compounds include phenyl (meth)acrylate, benzyl (meth)acrylate, 2-phenoxyethyl (meth)acrylate, 1,3,5-tribromophenyl (meth)acrylate and 2-(1',3',5'-tribromophenyl)-oxyethyl (meth)acrylate. The monomer may also be a di(meth)acrylate including, for example, 2,2'-bis[4-(methyl-acryloyloxy-ethoxy)phenyl]propane, and 2,2'-bis[(3,5-dibromo-4-methacryloyloxyethoxy)phenyl]-propane. Additional examples include various sulfur-containing diacrylate or dimethacrylate compounds, such as those having the formula $(CH_2=C(R^1)-COOR^3-S-R^4)_2-Ar$, wherein $R^1$ is a hydrogen or a methyl group, $R^3$ and $R^4$ are independently a C1-C12 alkylene group, and Ar is a substituted or unsubstituted arylene or heteroarylene group, such as a substituted or unsubstituted phenylene group. Examples include those described in U.S. Pat. Nos. 4,990,653 and 5,683,628.

The monomer may also be a mixture of polymerizable compounds. For example, the monomer may be a mixture comprising any of the specific monomers described above, along with at least one monomer which imparts additional optical or physical properties to the resulting polymer composition after polymerization. For example, the monomer may comprise at least one mono(meth)acrylate compound such as methyl (meth)acrylate, ethyl (meth)acrylate, n-propyl (meth)acrylate, isopropyl (meth)acrylate, n-butyl (meth)acrylate, isobutyl (meth)acrylate and t-butyl (meth)acrylate, cyclopentyl (meth)acrylate, cyclohexyl (meth)acrylate, methylcyclohexyl (meth)acrylate, trimethylcyclohexyl (meth)acrylate, norbornyl (meth)acrylate, isobornyl (meth)acrylate, adamantyl (meth)acrylate, dicyclopentanyl (meth)acrylate and dicyclopentenyl (meth)acrylate. In addition, di(meth)acrylate compounds as well as other crosslinkable monomer may also be included. Furthermore, the monomer may also be a polymerizable oligomeric compounds and/or small molecular weight polymers (often referred to as prepolymers) that can be further polymerized can also be used.

For this embodiment, the method of the present invention further comprises the steps of removing the non-aqueous solvent and polymerizing the polymerizable composition. These may be done in either order. A variety of different methods known in the art may be used for removing the non-aqueous solvent. For example, as discussed above for the first embodiment, the non-aqueous solvent may be removed by evaporation, either at atmospheric or reduced pressures. Thus, for this embodiment, the non-aqueous solvent should have a boiling point below that of the monomer. Also, the non-aqueous solvent can be removed under conditions that do not cause polymerization of the monomer. Alternatively, polymerization may occur simultaneously with removal of the solvent.

Furthermore, any method known in the art may be used to polymerize the monomer of the polymerizable composition, including, for example, radical polymerization (with or without the use of a catalyst, such as hydrosilation) or condensation polymerization, and the specific method will depend on the type of monomer. For example, for so-called two part silicones, the nanoparticle dispersion of modified metal oxide in a non-aqueous solvent and a vinyl siloxane may be combined, along with a catalyst, to form a first part, and this may be polymerized by combining with a second part comprising the vinyl siloxane and a siloxane comonomer. Polymerization occurs by reaction of the catalyst and the siloxane comonomer with the vinyl siloxane. A surprising advantage of the method of the present invention for such a polymerization system is that less catalyst would be needed and/or the ratio of siloxane comonomer and vinyl siloxane can be changed due to the presence of the modified metal oxide nanoparticle dispersion, which can provide additional crosslinking capabilities due to the interaction/reaction of the siloxane compounds with the coupling agent and/or metal oxide surface.

For both embodiments, the monomer or polymer may be present in any amount depending on a variety of factors, including the desired properties and use of the polymer composition. For example, for the preparation of polymer compositions useful in optical devices in which improved optical properties, such as a high refractive index, are desired, if a monomer or polymer is chosen having a refractive index that is lower than the refractive index of the modified metal oxide, then the amount of monomer or polymer should be minimized in order to produce a high refractive index polymer composition. In general, the higher the refractive index of the monomer or polymer, the higher the amount that may be used. Furthermore, the higher the refractive index of the modified metal oxide, or of the metal oxide and/or coupling agent which the modified metal oxide comprises, the higher the amount of monomer or polymer that may be used (that is, less of the high refractive index modified metal oxide is needed to still produce a polymer composition having a high refractive index), which may be desirable in order to provide, for example, improved mechanical and/or rheological properties and reduced cost. In general, the amount of monomer or polymer may be between about 5% and 95% by weight, based on the total weight of the polymer composition. For example, the monomer may be present in an amount of between about 5% and 90%, including between about 5% and 70% and between about 5% and 50% by weight, based on the total weight of the polymer composition.

Therefore, the method of the present invention comprises the steps of combining a nanoparticle dispersion of a metal oxide in a non-aqueous solvent and a coupling agent, forming a nanoparticle dispersions of a modified metal oxide in the non-aqueous solvent, and combining this and either a polymer, followed by removal of the non-aqueous solvent, or a monomer, followed by removal of the non-aqueous solvent and polymerization of the monomer to form the polymer, in either order, thereby forming a polymer composition comprising a modified metal oxide dispersed in the polymer. Surprisingly, it has been found that, throughout each step of the method, the nanoparticulate nature of the metal oxide is maintained. Thus, the method of the present invention produces a polymer composition comprising a modified nanoparticle dispersed in a polymer from a nanoparticle dispersion of a metal oxide in a non-aqueous solvent, without any isolation or purification steps and without a significant increase in particle size. Furthermore, once the nanoparticle dispersion of the metal oxide is formed, it has been found that additional dispersing or particle size reduction steps, such as the use of a mechanical disperser, are unnecessary. In effect, since the method of the present invention does not include any isolation or purification of the intermediate modified metal oxide, the present method can be considered to be a single pot process for preparing polymer compositions comprising nanoparticulate metal oxides. This method allows for the preparation of a polymer composition having a thorough homogenous dispersion of nanoparticles without significant aggregation of particles, which is important for preventing transmission losses due to scattering.

The present invention further relates to a polymer composition comprising a nanoparticle, preferably a modified nanoparticle, such as a modified nanoparticulate metal oxide, dispersed in a polymer, which is produced by the methods described above. The modified nanoparticle may be present in an amount of between about 5% and about 95% by weight, including between about 10% and about 95% by weight, between about 30% and about 95% by weight, or between about 50% and about 95% by weight, based on the weight of the polymer composition. Furthermore, the modified nanoparticle may be present in an amount between about 5% and about 90% by volume, including between about 20% and about 90% by volume, between about 30% and about 90% by volume, or between about 15% and about 50% by volume of the polymer composition.

In one embodiment, the polymer composition of the present invention has a refractive index greater than or equal to 1.5. More preferably, the refractive index of the polymer composition is greater than or equal to 1.6, even more preferably greater than or equal to 1.7, and most preferably greater than or equal to 1.8. Also, the polymer composition is preferably transparent rather than opaque, turbid, or translucent. As used herein, a transparent material is one that allows a high level of light transmission (i.e., low light absorbance) across the visible range, 400-800 nm. The absorbance, A, of a material having a sample thickness, L, (path length, measured in cm) and a concentration of modified metal oxide, c (weight of modified metal oxide/weight of composition) can be determined by measuring the percent transmission (% T) at specific wavelengths and using Equation I:

$$A = \frac{\log(100/\%T)}{(L*c)} \quad (I)$$

The transparent compositions of the present invention preferably have i) an absorbance, A, $\leq 6$, preferably $\leq 5$, more preferably $\leq 4$, and most preferably $\leq 3.5$ at 400 nm; ii) an absorbance, A, $\leq 3$, preferably $\leq 2.5$, and more preferably $\leq 2$ at 450 nm; and iii) an absorbance, A, $\leq 1$, preferably $\leq 0.5$, and more preferably $\leq 0.34$ at 650 nm. It has surprisingly been found that a polymer composition having a high refractive index value can be produced from a composition comprising at least one modified metal oxide, and that such a composition can be transparent, having low absorbance (a high transmission) across a range of wavelengths, particularly in the blue.

Thus, for this embodiment, the polymer composition of the present invention are transparent and also light in color. The amount of color will depend on a variety of factors, including, for example, the type and size of the modified metal oxide, the type of polymer, and the relative amounts of each, as well as the thickness of the sample. For example, polymer compositions having a thickness of approximately 200 microns that are prepared by combining a nanoparticle dispersion of a modified metal oxide (such as barium titanate) and a polymer (such as a silicone), while being transparent, have been found to have a color ranging between light yellow and amber, depending on the amount of modified metal oxide. However, it has surprisingly been found that the level of color may be further reduced by irradiating the composition with UV radiation. This photobleaching or photoaging of the composition can be done under a wide variety of conditions, including, for example, irradiating at room temperature for several hours with UV radiation. Thus, the method of the present invention may further comprise a step of photobleaching the polymer composition to reduce the level of color.

In another embodiment, the polymer composition of the present invention is transparent and remains transparent after thermal aging. For example, in some applications, it is desirable for the polymer composition to withstand conditions of high temperature and high humidity for an extended period of time, such as greater than or equal to 1000 hours, and remain transparent, without significant discoloration. It has surprisingly been found that the polymer compositions of the present invention, prepared using the methods described above, can withstand high temperature conditions for extended periods of time, and therefore have optical properties that are thermally resistant.

The polymer compositions of the present invention can be used in a variety of different applications but have been found to be particularly useful where a high refractive index is desirable. For example, the polymer compositions may be used in various types of optical devices, including, for example, lenses, prisms, light emitting diodes, holographic data storage devices, photonic crystal devices, wave guides, reflectors, immersion materials, and the like. Thus, the present invention further relates to an optical device comprising any of the polymer compositions described above.

The present invention will be further clarified by the following examples which are intended to be only exemplary in nature.

EXAMPLE

Example 1

This example describes the preparation of a polymer composition comprising a nanoparticle metal oxide and a polymer, using the method of the present invention.

A nanoparticle dispersion of $BaTiO_3$ in a glycol ether was prepared following the procedure described in T. Yogo, R. Fukuzawa, W. Sakamoto, and S. Hirano, *Journal of Nanoparticle Research*, (2005), 7, 633-640, with the exception that, instead of the modified complex alkoxide used by Yogo et al. a mixed metal oxide precursor (DBATI50, a double metal alkoxide with a 1:1 metal ratio of Ba and Ti, empirical formula $BaTi(OR)_x$, available from Gelest) was used for hydrolysis. Also, methoxy propanol was used as the glycol ether solvent. The particle size of the metal oxide in the dispersion was <50 nm, at a concentration of 0.23% by weight, and this dispersion was found to be stable for several weeks at room temperature.

To this was added a 10% by weight solution of Ethfac 161 (a phosphate ester of a 6-ethoxylated decanol, available from Ethox Chemicals) in the same glycol ether solvent (20% by weight coupling agent based on the weight of the metal oxide). A dispersion of a modified metal oxide comprising the reaction product of the $BaTiO_3$ and the alkyl phosphate ester was produced. No visible scattering was observed, and, thus, there was no significant increase in particle size.

To this nanoparticle dispersion of modified metal oxide was added PMM0021 (a methylphenyl polysiloxane available from Gelest), which is soluble in the glycol ether solvent. The solvent was then removed by vacuum distillation at 50-75 degrees C., resulting in the formation of a polymer composition comprising the modified metal oxide. There was no visible scattering observed in the resulting polymer composition, and, thus, there was no significant increase in particle size. The composition had a refractive index of 1.64.

Figure 2:
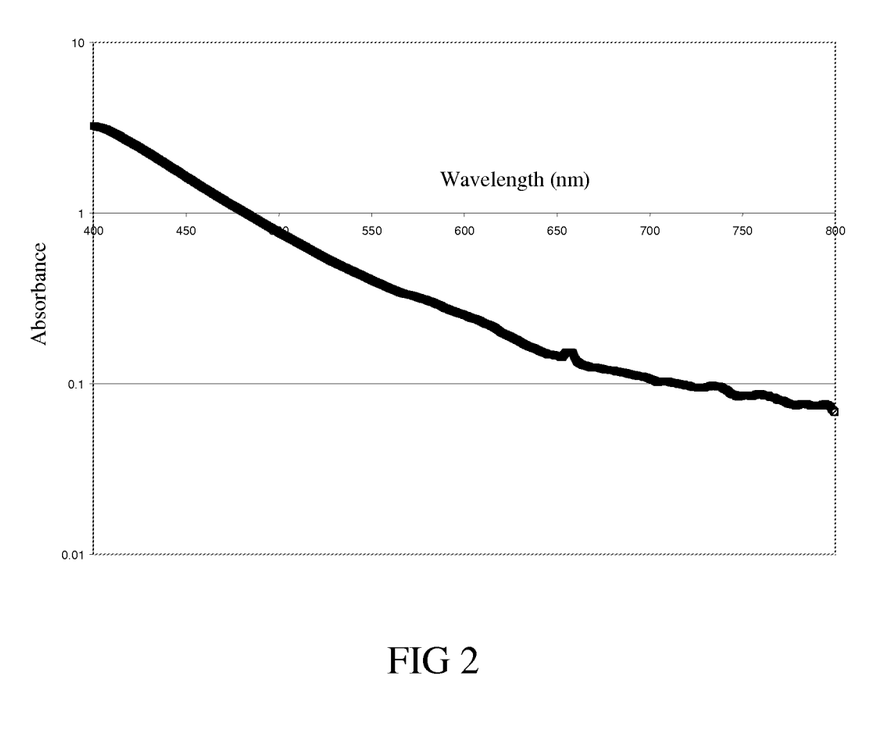
FIG. 2 and FIG. 3 show absorbance values of a polymer composition of the present invention across a range of wavelengths.
Figure 3:
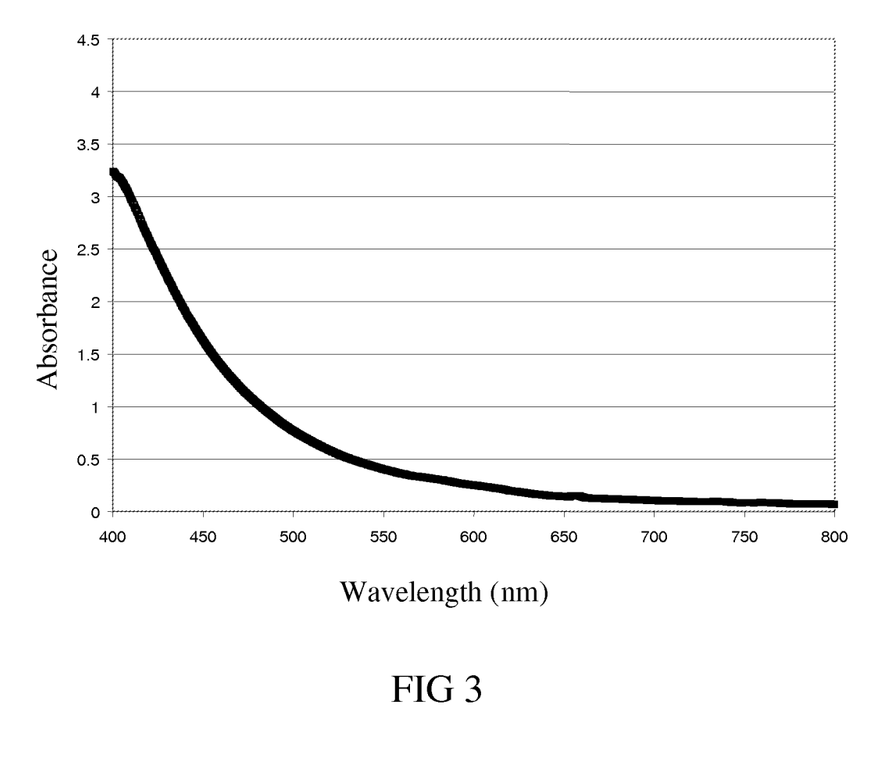

The UV-Vis transmission of the polymer composition of the present invention was measured, placed between two glass slides at normal incidence, using a standard lab UV-Vis spectrophotometer. Appropriate background was subtracted and the data converted to absorbance units using Equation I above. Results are shown in FIG. 2 (log plot) and FIG. 3 (normal scale). As can be seen, the polymer composition of the present invention has low absorption (low transmission losses) across a range of wavelengths. While these compositions were slightly yellow in color, they were also visually observed to be essentially haze free.

Furthermore, the polymer composition of the present invention was found to have improved rheological properties compared to the polymer used to prepare it. For example, the phenylmethyl polysiloxane is a low viscosity silicone oil, while the polymer composition of the present invention, comprising a nanoparticle dispersion of a modified metal oxide in this silicone oil, had significantly higher viscosity and would not flow at room temperature. Thus, the polymer composition of the present invention was found to have a combination of good rheological properties and good optical properties.

In addition, polymer compositions could be prepared using this procedure wherein the coupling agent is either butyl poly(dimethylsiloxane), 2-propoxyethyl phosphoric acid, which is a siloxane coupling agent having the structure Bu-$[SiMe_2\text{-}O]_n$—$SiMe_2$-$(CH_2CH_2CH_2$—O)—$CH_2CH_2OP(O)(OH)_2$, wherein n is 1-9, or butyl poly(dimethylsiloxane), 2-propoxyethyl phosphonic acid, which is a siloxane coupling agent having the structure Bu-$[SiMe_2\text{-}O]_n$—$SiMe_2$-$(CH_2CH_2CH_2$—O)—$CH_2CH_2P(O)(OH)_2$, wherein n is 10.

Example 2

A polymer composition of the present invention comprising 3.9% $BaTiO_3$, 1.9% Ethfac 161, and 95% PMM0021 by volume was prepared using the procedure described in Example 1. The refractive index of this composition was found to be 1.556. A sample of this composition was placed into the bottom of a glass vial to form a film with a surface area of approximately 5 cm$^2$ and a thickness of approximately 150-200 microns, as measured by profilometry. This film was transparent and slightly yellow in color.

Figure 4:
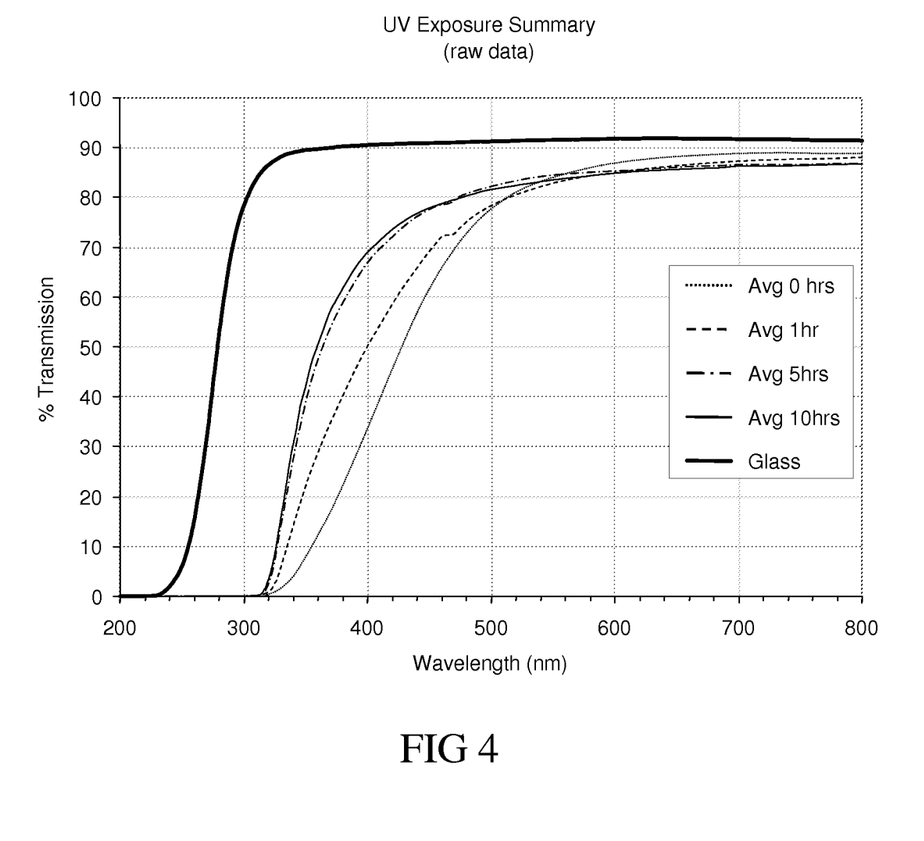
FIG. 4 and FIG. 5 show % transmission values of a polymer composition of the present invention across a range of wavelengths after exposure to UV radiation at various time intervals.
Figure 5:
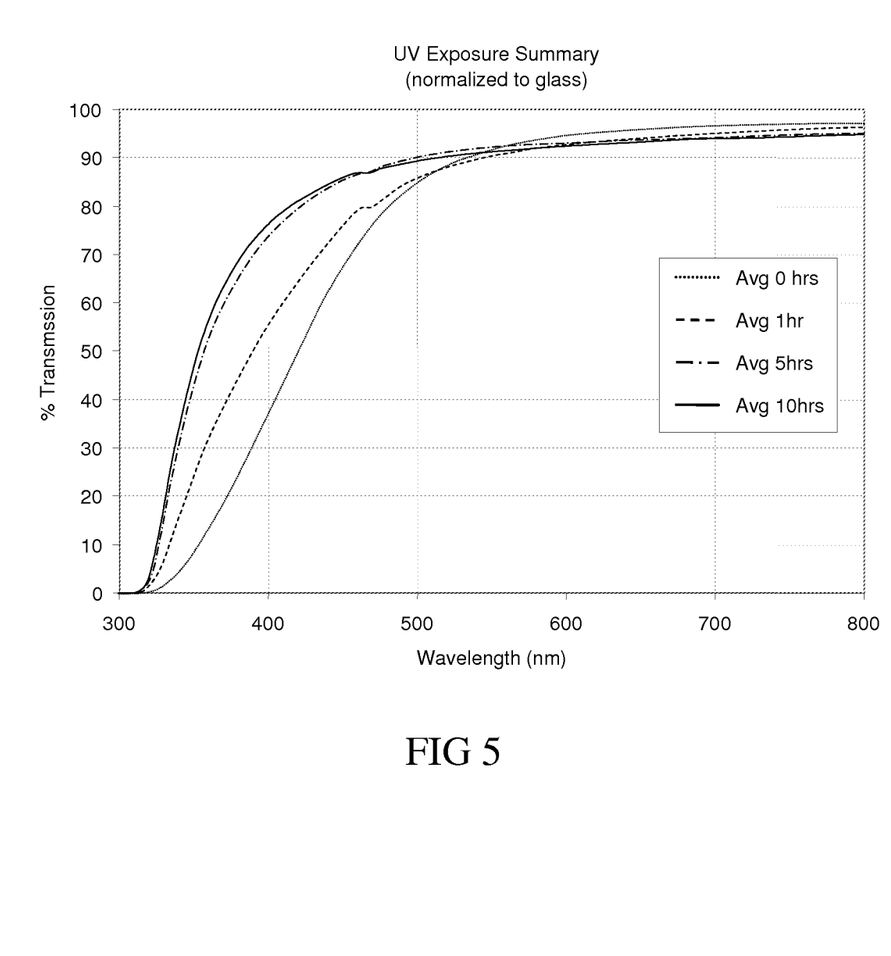

Accelerated UV aging of this sample was performed by irradiating the sample for several hours in a UV curing chamber (Amergraph V28 VMS) which uses a 1200 Watt metal halide lamp ($\lambda$=350-400 nm) under ambient atmosphere. The UV-Vis transmission of the polymer composition, placed between two glass slides at normal incidence, was measured using a standard lab UV-Vis spectrophotometer after UV exposure for 1 hour and 5 hours. Results are shown in FIG. 4 and FIG. 5 (which is the data from FIG. 4 normalized to glass). While, after only 1 hour of exposure, the loss in color was not visible to the naked eye, UV/vis transmission data showed a slight decrease in color. However, after five hours of UV exposure, a reduction in color was clearly visible. The sample was significantly less colored, and the % T data supported this observation. Thus, exposure of the polymer compositions of the present invention to UV radiation can reduce the observed color, and this photobleaching produces a composition that is not only transparent but is also nearly colorless.

Example 3

A polymer composition of the present invention comprising 3.9% $BaTiO_3$, 1.9% Ethfac 161, and 95% PMM0021 by volume was prepared using the procedure described in Example 1. A sample of this composition was placed into the bottom of a glass vial to form a film with a surface area of approximately 5 cm$^2$ and a thickness of approximately 200 microns. This film was transparent and slightly yellow in color.

Figure 6:
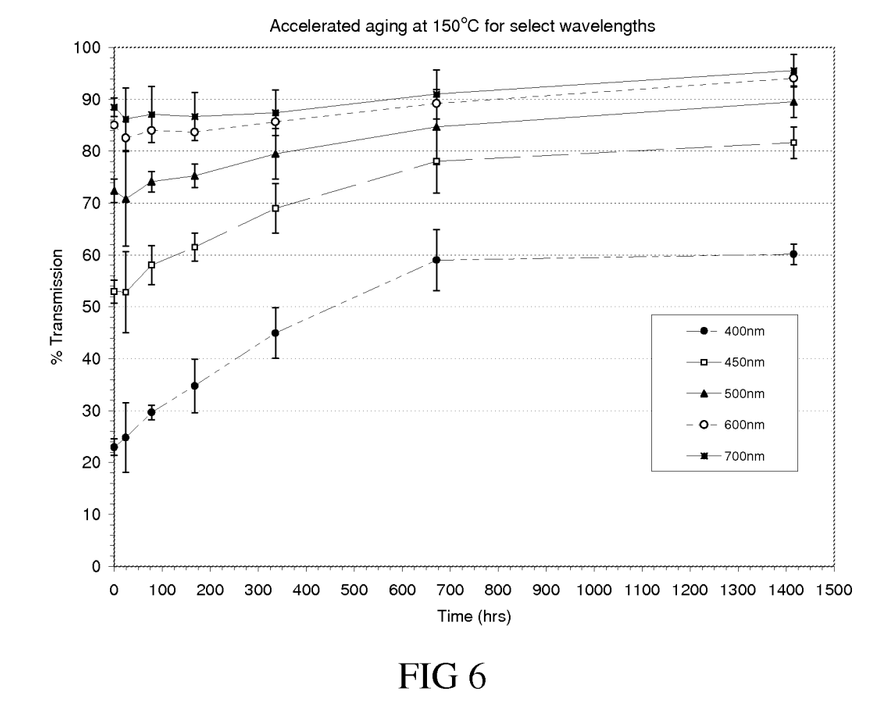
FIG. 6 shows % transmission values of a polymer composition of the present invention at various wavelengths at different durations of thermal aging.

Accelerated thermal aging of this film was performed by storing the sample for over 1000 hrs in a 150° C. oven, and the % transmission was measured over this time period at different wavelengths. The results are shown in FIG. 6. As can be seen, the sample exhibited a small initial drop in % transmission of several percentages after 24 hrs across the spectrum at long wavelengths, but then for the duration of the test (>1000 hours), within experimental error, the % transmission remained high and relatively constant (approximately 95% transmission for $\lambda$=600-700 nm, 90% for $\lambda$=500 nm, and 75% for $\lambda$=400 nm). Thus, the film produced from the polymer composition of the present invention did not exhibit significant "yellowing" (the onset of yellow color formation, and a high degree of near UV light absorption). This is surprising since it is known that oxidation often occurs for these types of systems, and, as they degrade, they yellow noticeably. In addition, samples of the uncured silicones with an equivalent weight loading of Ethfac 161, as a control sample, exhibited degradation and severe yellowing within 24 hours at 150° C.

Thus, the polymer compositions of the present invention have surprisingly been found to be thermally stable and have been found to have optical properties that remain relatively unchanged after thermal aging.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing a transparent polymer composition comprising a modified nanoparticle dispersed in a polymer, wherein the method comprises the steps of:
   i. hydrolyzing a metal oxide precursor in a water miscible non-aqueous solvent to form a non-aqueous nanoparticle dispersion of a metal oxide in a water miscible non-aqueous solvent, the nanoparticles having an average particle size of less than 50 nm;
   ii. combining the non-aqueous nanoparticle dispersion and at least one coupling agent to form a nanoparticle dispersion of a modified metal oxide in the water miscible non-aqueous solvent, wherein the metal oxide and the coupling agent are combined in a weight ratio of between about 25:1 and about 100:1 metal oxide to coupling agent;
   iii. combining the nanoparticle dispersion of the modified metal oxide in the water miscible non-aqueous solvent and at least one polymer; and
   iv. removing the water miscible non-aqueous solvent to form the transparent polymer composition, wherein the coupling agent has a refractive index of greater than or equal to 1.48 and wherein the polymer composition has an absorbance of less than or equal to 6 at 400 nm, an absorbance of less than or equal to 3 at 450 nm, and an absorbance of less than or equal to 1 at 650 nm.

2. The method of claim 1, wherein the polymer is soluble in the water miscible non-aqueous solvent.

3. The method of claim 1, wherein the polymer is dissolved in an organic solvent to form a polymer solution that is soluble in the water miscible non-aqueous solvent.

4. The method of claim 1, wherein the coupling agent has a refractive index of greater than or equal to 1.6.

5. The method of claim 1, wherein the metal oxide and coupling agent are combined in a weight ratio of between about 50:1 and about 100:1 metal oxide to coupling agent.

6. The method of claim 1, wherein the metal oxide has a refractive index of greater than or equal to 1.8.

7. The method of claim 1, wherein the metal oxide is a titanate.

8. The method of claim 1, wherein the metal oxide is rutile titania.

9. The method of claim 1, wherein the metal oxide is barium titanate.

10. The method of claim 1, wherein the metal oxide has a particle size of between about 2 and about 15 nm in the nanoparticle dispersion in the water miscible non-aqueous solvent.

11. The method of claim 1, wherein the modified metal oxide has a particle size of between about 2 and about 15 nm in the nanoparticle dispersion in the water miscible non-aqueous solvent.

12. The method of claim 1, wherein the coupling agent comprises at least one group capable of reacting with the metal oxide and at least one group capable of interacting with the water miscible non-aqueous solvent, the polymer, or both.

13. The method of claim 12, wherein the group capable of reacting with the metal oxide comprises at least one metal-containing group, at least one carboxylic acid group, at least one sulfinic acid group, at least one sulfonic acid group, at least one thiol group or at least one phosphorous-containing group.

14. The method of claim 12, wherein the group capable of reacting with the metal oxide comprises at least one phosphonic acid group.

15. The method of claim 12, wherein the group capable of interacting with the polymer comprises at least one alkylene oxide group.

16. The method of claim 15, wherein the group capable of interacting with the polymer comprises a polyalkylene oxide group having the formula $-(O-ALK1)_x-(O-ALK2)_y-(O-ALK3)_z-$, wherein ALK1, ALK2, and ALK3 are linear or branched C1-C8 alkylene groups, x is 1 to 10, and y and z are 0 to 10.

17. The method of claim 1, wherein the polymer composition has a refractive index of greater than or equal to 1.5, an absorbance of less than or equal to 6 at 400 nm, an absorbance of less than or equal to 3 at 450 nm and an absorbance of less than or equal to 1 at 650 nm.

18. The method of claim 17, wherein the polymer composition has a refractive index of greater than or equal to 1.7.

19. A method of preparing a polymer composition comprising a modified nanoparticle dispersed in a polymer, wherein the method comprises the steps of:
   i. hydrolyzing a metal oxide precursor in a water miscible non-aqueous solvent to form a non-aqueous nanoparticle dispersion of a metal oxide in a water miscible non-aqueous solvent, the nanoparticles having an average particle size of less than 50 nm;
   ii. combining the non-aqueous nanoparticle dispersion of a metal oxide and at least one coupling agent to form a nanoparticle dispersion of a modified metal oxide in the water miscible non-aqueous solvent, wherein the metal oxide and the coupling agent are combined in a weight ratio of between about 25:1 and about 100:1 metal oxide to coupling agent;
   iii. combining the nanoparticle dispersion of the modified metal oxide in the water miscible non-aqueous solvent and at least one polymer to form the polymer composition; and
   iv. removing the water miscible non-aqueous solvent, wherein the polymer composition has a refractive index of greater than or equal to 1.5 and is transparent and wherein the polymer composition has an absorbance of less than or equal to 6 at 400 nm, an absorbance of less than or equal to 3 at 450 nm, and an absorbance of less than or equal to 1 at 650 nm.

* * * * *